United States Patent [19]  [11] 4,122,075
Jaeger et al.  [45] Oct. 24, 1978

[54] METHOD OF PREVENTING DEPOSIT OF POLYMER IN REACTOR VENT LINE DURING PREPARATION OF NYLON

[75] Inventors: Joseph Jaeger; Robert D. Sauerbrunn, both of Seaford, Del.

[73] Assignee: E. I. Du Pont de Nemours and Company, Wilmington, Del.

[21] Appl. No.: 811,284

[22] Filed: Jun. 29, 1977

Related U.S. Application Data

[63] Continuation of Ser. No. 670,879, Mar. 26, 1976, abandoned.

[51] Int. Cl.$^2$ ............................................. C08G 69/28
[52] U.S. Cl. .................................. 528/332; 260/95 R; 528/484
[58] Field of Search .................. 260/78 R, 78 A, 78 L

[56] References Cited

U.S. PATENT DOCUMENTS 3,679,635  7/1972  Portus ................................. 260/78 R

OTHER PUBLICATIONS

Korshak-Frunze: Synthetic Hetero-Chain Polyamides, 1964, p. 1.

*Primary Examiner*—Harold D. Anderson

[57] ABSTRACT

A process for preventing deposits when venting steam containing entrained polymer from high pressure reactors used for preparing nylon from dicarboxylic acid and diamine. The hot steam generated during condensation polymerization of the reactants is vented through a pressure-control valve at a rate which maintains a desired pressure in the reactor. Deposit of polymer in the valve or vent pipe after release of pressure is prevented by injecting water into the low pressure side of the valve or into the subsequent vent pipe. At least sufficient water is used to saturate the vented steam and to wet the walls of the vent pipe.

2 Claims, 2 Drawing Figures

METHOD OF PREVENTING DEPOSIT OF POLYMER IN REACTOR VENT LINE DURING PREPARATION OF NYLON

This is a continuation of application Ser. No. 670,879, filed Mar. 26, 1976, now abandoned.

BACKGROUND OF THE INVENTION

This invention relates to a process for producing nylon, and is more particularly concerned with preventing deposits of polymer from steam which is vented during preparation of nylon from monomer in the form of aqueous salts of amines and carboxylic acids.

The term "nylon" is defined herein as in the American Society For Testing And Materials, Designation D 123-74a, "Standard Definitions of Terms Relating To Textile Materials" (1974), as a generic term for any long-chain synthetic polymeric amide which has recurring amide groups as an integral part of the main polymer chain, and which is capable of being formed into a filament in which the structural elements are oriented in the direction of the axis. The term "66-nylon" refers to polyhexamethyleneadipamide.

In the condensation polymerization process for producing nylon from an aqueous salt of a diamine and a dicarboxylic acid, or aqueous ω-aminocarboxylic acid, the reaction mixture is heated under autogeneous pressure to remove water present at the start and formed by condensation reaction. The water is discharged as steam through a pressure-control valve and vent pipes. In a typical autoclave cycle for producing 66-nylon from hexamethylene diamine and adipic acid, the aqueous salt may be heated until the steam pressure reaches at least 250 psig (17.5 kg./cm$^2$). Steam is then released through a valve and vent pipe at a rate which maintains constant pressure in the autoclave. Later in the polymerization cycle, the temperature is raised and the pressure is lowered to continue the reaction.

The aqueous salt solution boils vigorously during this process. Molten nylon of low viscosity becomes entrained in the steam vapor. As the steam vapor and entrained aerosols pass through the valve, the pressure decreases suddenly. The saturated steam becomes dry, superheated steam and the nylon aerosols rapidly release water due to the sudden pressure drop and to exposure to the drier steam atmosphere. This results in rapid cooling of the molten aerosol with a concurrent increase in viscosity. The viscosity also increases due to further polymerization of the aerosol from a reduction in water content.

The cooled and viscous entrained aerosols stick to and solidify on the low pressure side of the valve and on the dry vent walls. The aerosols continue to polymerize and eventually degrade. The heaviest accumulation is generally close to the valve. Within a few weeks to a few months, the accumulation of polymer builds up to restrict the flow of vapor from the processing vessel, and absolute pressure control becomes difficult. This requires shutting down the processing equipment with a loss of production, and high maintenance costs for cleaning the vent line and the process equipment. In many commercial installations, dual vent lines are provided. This avoids the requirement for shutting down the process equipment when one vent line must be cleaned, but requires additional investment and still involves high maintenance costs on the vent lines.

SUMMARY OF THE INVENTION

The present invention provides a method of preventing polymer deposition from steam vented during production of nylon. In accordance with the invention, water is injected into the low pressure side of the pressure-control valve, or into the downstream vent pipe adjacent to the valve. At least sufficient water is used to saturate the vented steam and to wet the walls of the vent pipe. Preferably, enough water is injected to condense most of the steam, i.e., an amount which is observed to cause a substantial decrease in the vent-line pressure. A greater excess of water can be injected but is unnecessary.

Entrained polymer aerosols are prevented from forming deposits on wet walls of the vent system and are conveyed harmlessly away. The addition of water also stops further polymerization or degradation of polymer entrained in the steam. The invention avoids, or substantially reduces, the previous maintenance for cleaning the vent system. The pressure in the reactor is easier to control because of the clean vent system.

DETAILED DESCRIPTION

Figure 1:
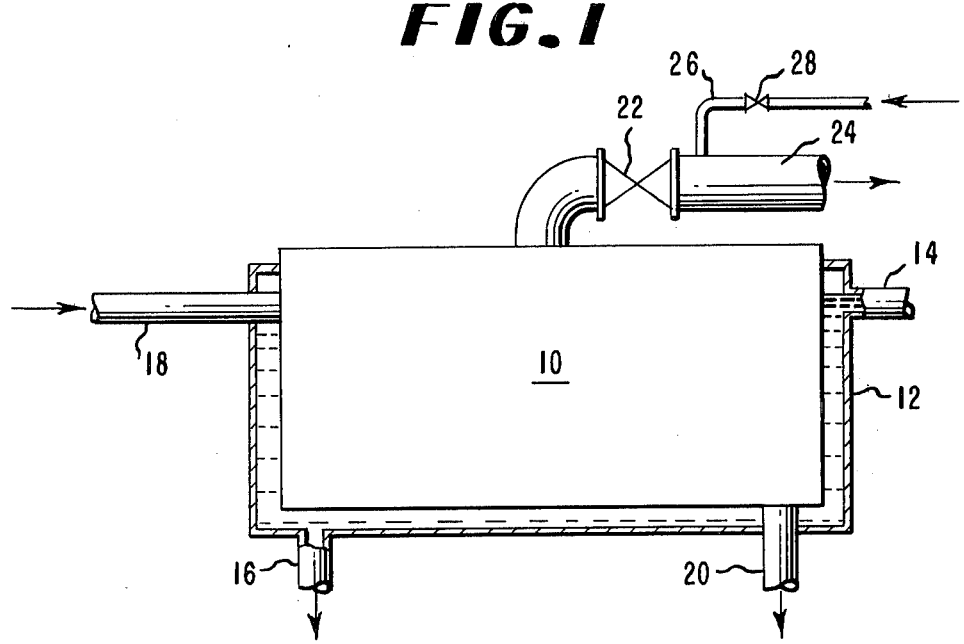
FIG. 1 is a schematic side view of one embodiment of reactor, pressure-control valve, vent pipe and water-injection line.

FIG. 1 illustrates a commercial reactor, suitable for preparing nylon from adipic acid and hexamethylene diamine, which has been modified for injecting water in accordance with the present invention. Reactor 10 is a horizontal cylindrical vessel provided with a heating jacket 12. Heating fluid enters the jacket through inlet 14 and exhausts through outlet 16. A mixture of the reactants is introduced into the reactor through inlet pipe 18 and polymer is withdrawn through outlet pipe 20. Steam is discharged through pressure-control valve 22 into vent pipe 24. Water is supplied to the vent pipe through water-injection line 26, the flow being regulated by throttling valve 28 to supply at least sufficient water to saturate the vented steam and to wet the walls of the vent pipe.

Figure 2:
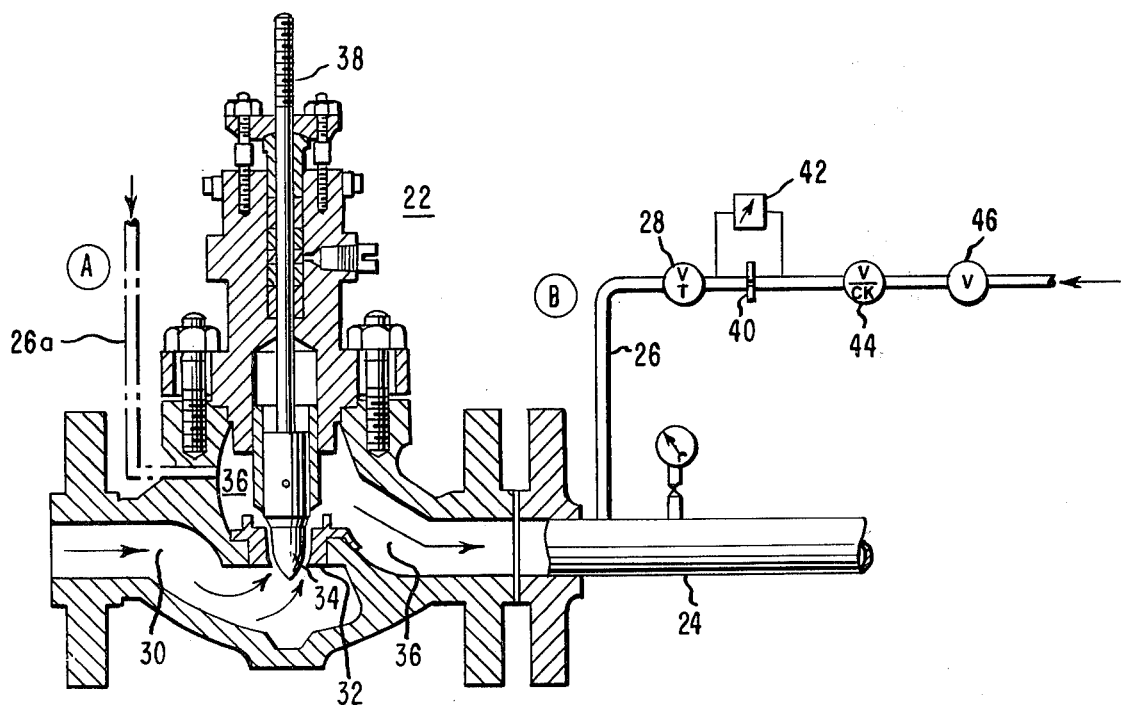
FIG. 2 is a detailed cross-sectional view of a pressure-control valve together with means for injecting water to saturate vented steam and to wet the walls of a vent pipe.

Details of a typical pressure-control valve are shown in FIG. 2. High-pressure steam from the reactor passes into chamber 30, through an annular orifice between valve seat 32 and plug 34, passes at low pressure into chamber 36, and is discharged through vent pipe 24. The position of plug 34 is adjusted by valve stem 38 to maintain the required pressure in the reactor. Water is supplied to the vent pipe at position B, adjacent the low-pressure side of the valve, through water-injection line 26. The water flow rate is regulated by throttling valve 28. An orifice plate 40 and pressure-differential monometer 42 are provided for indicating the flow rate. A check valve 44 and a shutoff valve 46 are also indicated in the water-injection line.

Instead of supplying water to the vent pipe, the water can be supplied to the low pressure side of the pressure-control valve. As indicated at position A, water-injection line 26a introduces water into chamber 36 of the valve. Suitable means for regulating the water flow rate (not shown) are provided as disclosed above for water-injection line 26.

The following examples illustrate specific embodiments of the invention.

EXAMPLE 1

This example illustrates the use of the invention in a batch process for producing nylon from hexamethylenediamine and adipic acid in an autoclave reactor.

A commercial autoclave vent pipe is modified for water injection just downstream of the valve, as shown at position B in FIG. 2 of the drawing. The vent pipe is 1½ inches (3.8 cm) in diameter and approximately 75 feet (23 meters) long. The temperature of the superheated process steam as it leaves the pressure control valve is approximately 280° C. Steam flow rate varies from zero to 3600 lbs. per hour (1600 kg./hr.). Water is injected at the rate of 350 lbs. per hour (160 kg./hr.). The water injection rate is constant whenever the valve is open. All superheat is eliminated and much of the process steam is condensed as shown by a decrease in vent-pipe pressure. Using water injection, the vent line remains completely clean for many months. Without water injection, the vent must be cleaned about every 4 weeks.

In a separate test, 150 lbs. (70 kg.) of water/hr. is injected. The vent line pressure does not decrease, indicating that this amount of water is insufficient to saturate the vented steam and wet the walls of the vent-pipe.

EXAMPLE 2

This example illustrates the use of the invention in a continuous process of the type disclosed in Heckert U.S. Pat. No. 2,689,839 for producing nylon from hexamethylenediamine and adipic acid.

The vent valve for controlling steam pressure in the reactor is modified to accept water injection at the low-pressure side of the valve (position A in FIG. 2 of the drawing). Steam temperature at the valve is about 250° C., the pipe diameter is 1½ inches (3.8 cm.) and the pipe length is about 8 ft. (2.5 m.). The steam flow rate is a constant 3300 lbs. per hour (1500 kg./hr.). Water is injected at the rate of 200 ± 50 lbs. per hour (90 ± 23 kg./hr.). The valve and vent pipe remain clear of deposits for many months. Without the water injection, the vent-pipe must be cleaned about every 2 weeks.

The minimum amount of water required is that needed to saturate the steam and to wet the walls of the vent pipe. Excess water can be used, so that most of the process steam is condensed, and this method of operation is preferable.

The invention is applicable to the preparation of condensation polymers from diamines and dicarboxylic acids or ω-aminocarboxylic acids.

I claim:

1. In a process for producing poly(hexamethylene adipamide) from an aqueous solution of a salt of hexamethylenediamine and adipic acid wherein the aqueous solution of salt is heated under pressure in a reactor and steam is released at pressure of 180 to 275 pounds per square inch gauge pressure through a pressure-control valve into a vent pipe; the improvement for preventing deposition of polymer entrained in the steam vented at 180 to 275 pounds per square inch gauge pressure which comprises injecting water into said steam at the low pressure side of the valve or adjacent thereto in the vent pipe, at least sufficient water being injected to cause a substantial decrease in vent-pipe pressure and to wet the walls of the vent pipe.

2. A process as defined in claim 1 wherein enough water is injected to condense most of the vented steam.

* * * * *